G. R. FORD.

DISPLAY STAND.

APPLICATION FILED FEB. 8, 1910.

Reissued Mar. 29, 1910. 13,098.

Witnesses

C. H. Walker.

A. O. Logan.

Inventor

George R Ford.

By Chas F Schmely

Attorney

ANDREW B. GRAHAM CO. PHOTO-LITHOGRAPHERS, WASHINGTON, D. C.

UNITED STATES PATENT OFFICE.

GEORGE R. FORD, OF HARTFORD, CONNECTICUT, ASSIGNOR TO EDWIN C. LOOMIS, OF WINDSOR, CONNECTICUT.

DISPLAY-STAND.

13,098. Specification of Reissued Letters Patent. Reissued Mar. 29, 1910.

Original No. 910,659, dated January 26, 1909, Serial No. 445,902. Application for reissue filed February 8, 1910. Serial No. 542,806.

*To all whom it may concern:*

Be it known that I, GEORGE R. FORD, a citizen of the United States, and resident of Hartford, in the county of Hartford and State of Connecticut, have invented certain new and useful Improvements in Display-Stands, of which the following is a full, clear, and exact specification.

This invention relates to apparatus for displaying goods in stores, and more particularly to that class thereof in which such goods may be clamped in place while at the same time the articles exhibited may be inspected all around.

My invention has for one of its objects the provision of a device of this character in which a plurality of articles or goods may be displayed to best advantage.

A further object of the invention resides in the particular holder which comprises one of the elements of the display stand and which also incorporates means whereby the same may be adjusted to hold articles of different sizes and shapes.

My invention has, furthermore, for its object the provision of a display stand in which the holders may be manipulated without in any way touching the articles held therein.

The invention has been clearly illustrated in the accompanying drawings in which similar characters denote similar parts, and in which—

Figure 1:
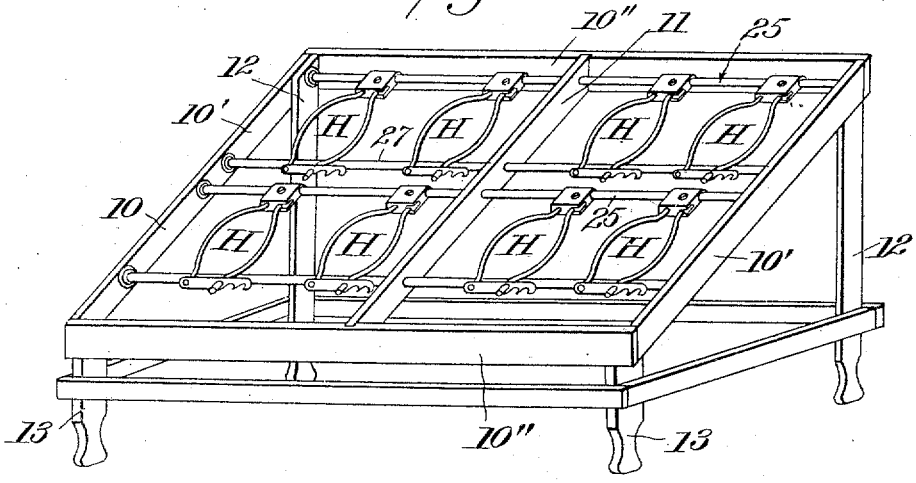
Figure 2:
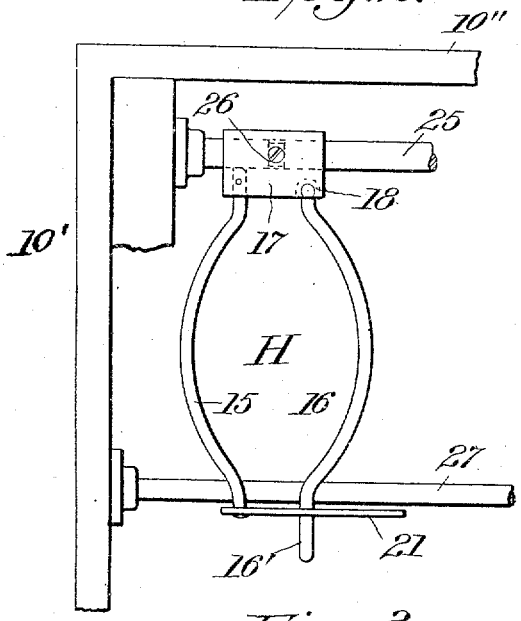
Figure 4:
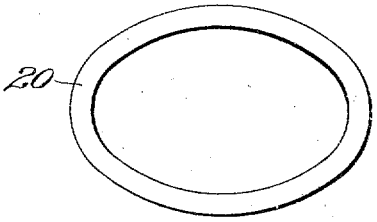
Figure 5:
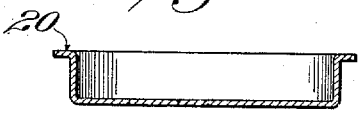
Figure 3:
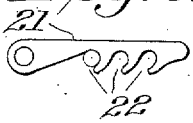

Figure 1 is a perspective view of a display stand embodying my improvements. Fig. 2 is a fractional top view of the holder on an enlarged scale. Fig. 3 illustrates one of the devices which are preferably employed in connection with the holder to adjust the same for different sizes of articles, and Figs. 4 and 5 illustrate a top view and section, respectively, of a tray or plate which may be used in conjunction with the holder.

Generically speaking, the display stand is primarily designed to display meats such as ham-ends or shoulders from which slices have been cut, the meat being placed into the holders with the cut face upward; yet in conjunction with the holders, trays may be used for the purpose of receiving slices of meat if so desired.

While a display stand may be constructed to incorporate my invention in many different ways, I have shown in the accompanying drawings a stand which comprises a frame 10 which is inclined so that the beholder may inspect the meat in a line of vision substantially at right angles to the plane of the frame. This frame comprises in the present instance side bars 10′ and front and rear bars 10″ which may be, furthermore, spaced from each other by a central tie 11, as shown in Fig. 1. Suitable standards or posts 12 and 13 may be attached to the frame to hold the latter in proper position on the counter of the store.

The devices whereby the goods are displayed in the stand consist of a series of holders indicated in a general way by H and which in the preferred form thereof shown comprise a pair of coöperative arms 15, 16 which may be attached to a block 17 so as to have one of said arms pivoted thereon as at 18. The clamping arms 15 and 16 are preferably bent or bowed to adapt them to receive the articles to be exhibited thereby, or to hold the tray 20 illustrated in Figs. 4 and 5.

Means are provided for holding the front or loose ends of the arms 15 and 16 in proper relation to each other so as to hold or clamp the articles to be exhibited between them. In connection with this statement it may be said that as far as meats are concerned, these arms will naturally embed themselves into the meat by drawing the outer ends of the arms 15, 16 together; while when the tray 20 is used, these arms 15 and 16 are spaced properly apart to receive the tray without really gripping the same. The means for distancing the free ends of the arms 15 and 16 consists preferably of a clip 21 pivoted at the free end of the arm 15 and provided with a series of notches 22; any one may be placed over the projecting end 16′ of the arm 16, so that consequently, the distance between the arms 15 and 16 may be varied as desired.

The holders H may be of any desired number, and they are supported at their upper ends by rods 25 extending between the side frames 10′ and also finding a central support in the tie 11.

While many different ways may be devised for holding the blocks 17 on the support-rods 25, I have illustrated the latter passing through said blocks which are provided with set-screws 26 for holding each holder in position on the support-rod independently of any other of the series, the support-rod being provided with an annular groove to receive said set-screw so that the holder in its entirety may be swung upward and around the axis of the support-rod 25, and any number of grooves may be provided in the rod longitudinally thereof so that the holders may be shifted to any desired position thereon.

The free ends of the holders H come to rest upon ledge-bars 27 which may also extend from end to end of the frame shown, and upon which the free ends of said holders loosely rest so that when desired each holder may be swung upward, thus bringing the bottom portion of the article displayed in the holder, into view, for inspection.

I claim:—

1. In a display stand the combination with the frame, of a supporting bar extending from side to side thereof, one or more holders pivotally mounted on said supporting bar, said holders comprising oppositely bowed arms, means for varying the size of the opening between said arms, and means for supporting the lower end of said holder.

2. In a display stand the combination with the frame, of a supporting bar extending from side to side thereof, one or more holders pivotally mounted on said bar, each of said holders comprising a pair of oppositely bowed arms one of which is pivotally mounted, a clip on the other arm having engaging projections to hold said pivoted bar in any desired position of adjustment.

3. In a display stand the combination with the frame, of a supporting bar extending from side to side thereof, a holder comprising a hub pierced to fit said bar, said hub being held against lengthwise movement along said bar but adapted to rock thereon, a pair of oppositely bowed arms secured at one end to said hub, means for securing the opposite ends of said arms together in different positions of adjustment, and a support for the lower end of said holder.

4. In a display stand the combination with a frame, of one or more holders pivotally mounted for free swinging movement around a horizontal axis on said frame and each comprising a pair of coöperative arms, means for positioning the holders on the frame, means for positively holding said arms in position relative to each other, and means for supporting the free ends of said holders.

5. The combination with a frame, of one or more holders mounted for free swinging movement thereon, each of said holders comprising a pair of coöperative arms, and means for positioning said arms relatively to each other, means for positioning said holders on the frame, and means for supporting the free ends of said holders.

6. The combination with a frame, and a supporting-bar carried thereby, of a holder comprising a block pivotally mounted on said bar, a pair of arms attached to said block, means for supporting the ends of said arms, and means for distancing said arms relatively to each other.

7. The combination with a frame and a supporting-bar carried thereby, of a holder comprising a block pivotally supported on said bar, an arm secured with one end to said holder, and an arm for coöperation with the first arm pivoted at one end thereof to said block, means for variably distancing the free ends of said arms relatively to each other, and means for supporting the free ends of said arms.

GEORGE R. FORD.

Witnesses:

CHAS. F. SCHMELZ,
EDWIN C. LOOMIS.